July 19, 1966 A. R. CRIPE 3,261,625
JOINT BETWEEN VERTICAL AND HORIZONTAL
MEMBERS IN A PARTITION CONSTRUCTION
Filed Dec. 27, 1961 8 Sheets-Sheet 1

INVENTOR
ALAN R. CRIPE

BY Glenn, Palmer & Matthews
HIS ATTORNEYS

INVENTOR
ALAN R. CRIPE

BY Glenn, Palmer & Matthews
HIS ATTORNEYS

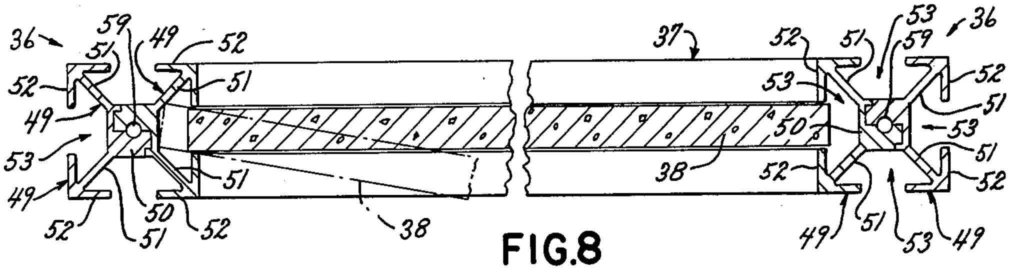
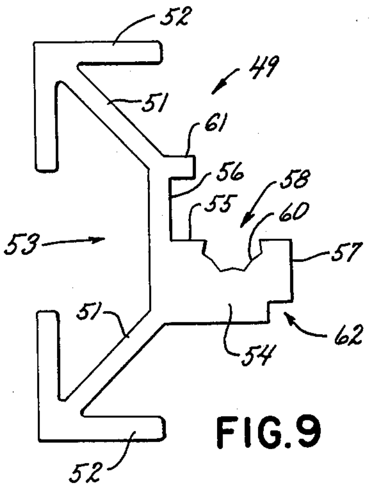
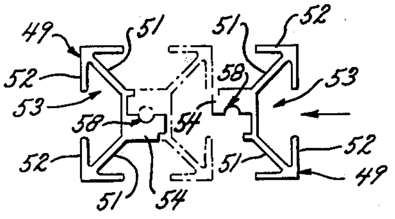
FIG.10
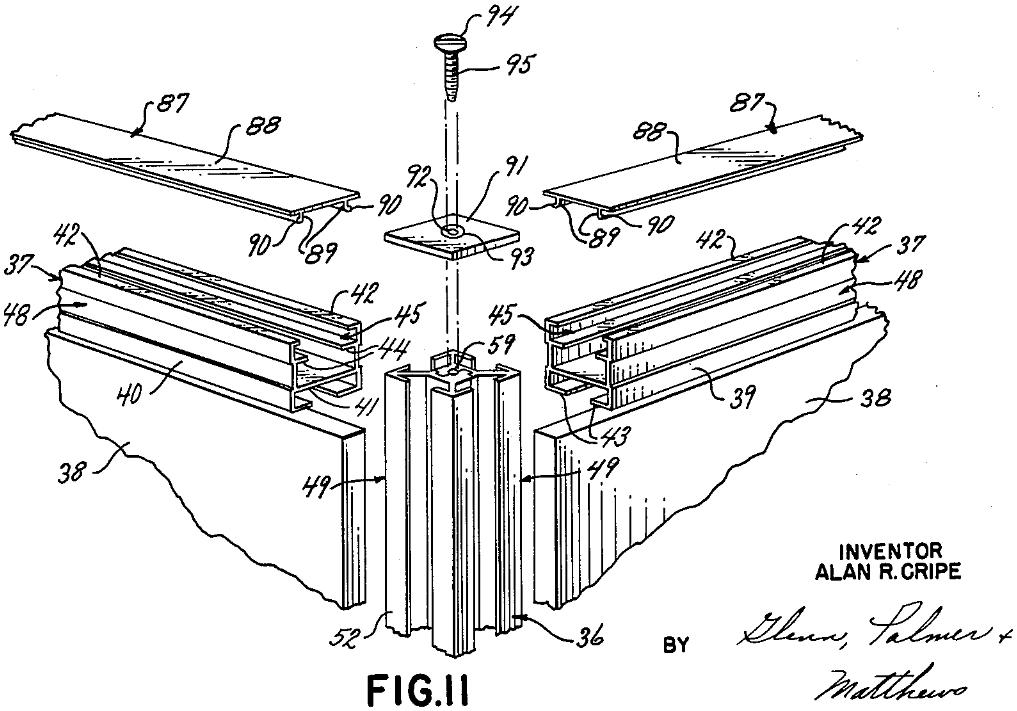
FIG.11
INVENTOR
ALAN R. CRIPE
BY Glenn, Palmer + Matthews
HIS ATTORNEYS INVENTOR
ALAN R. CRIPE
BY Glenn, Palmer & Matthews
HIS ATTORNEYS JOINT BETWEEN VERTICAL AND HORIZONTAL MEMBERS IN A PARTITION CONSTRUCTION
Filed Dec. 27, 1961

INVENTOR
ALAN R. CRIPE

BY Glenn, Palmer & Matthews
HIS ATTORNEYS

July 19, 1966 A. R. CRIPE 3,261,625

JOINT BETWEEN VERTICAL AND HORIZONTAL MEMBERS IN A PARTITION CONSTRUCTION

Filed Dec. 27, 1961 8 Sheets-Sheet 6

INVENTOR
ALAN R. CRIPE

BY Glenn, Palmer + Matthews

HIS ATTORNEYS

INVENTOR
ALAN R. CRIPE

BY Glenn, Palmer & Matthews
HIS ATTORNEYS

INVENTOR
ALAN R. CRIPE

BY Glenn, Palmer & Matthews
HIS ATTORNEYS 3,261,625

JOINT BETWEEN VERTICAL AND HORIZONTAL MEMBERS IN A PARTITION CONSTRUCTION

Alan R. Cripe, Chagrin Falls, Ohio, assignor to Reynolds Metals Company, Richmond, Va., a corporation of Delaware Filed Dec. 27, 1961, Ser. No. 162,396
4 Claims. (Cl. 287—189.36)

This invention relates to improved partition constructions for buildings and the like as well as to improved parts for making such constructions or the like.

It is well known that various types of partition members have been provided which can be assembled together to partition rooms and the like into various sections.

For example, existing office space can be subsequently partitioned into various sections by floor to ceiling partition constructions or other desired height partition constructions without requiring the use of conventional and expensive building procedures.

In this manner various decorative panels can be utilized together with prefabricated horizontal and vertical framing members to form such partition constructions in a minimum of time and effort without excess expense, the framing members usually being formed in an inexpensive manner by extending metallic material in conventional extruding apparatus.

Therefore, it is an object of this invention to provide improved partition constructions of the above types and having one or more of the novel features of this invention.

Another object of this invention is to provide improved parts for such partition constructions or the like.

Other objects, uses and advantages of this invention are apparent from a reading of this description which proceeds with reference to the accompanying drawing forming a part thereof and wherein:

FIGURE 8 is an enlarged, fragmentary cross-sectional view taken on line 8—8 of FIGURE 2.

FIGURE 9 is an enlarged end view of one of the elements for forming one of the partition members of this invention.

FIGURE 10 is a reduced end view of the elements of FIGURE 9 and illustrates the method of forming one of the partition members of this invention.

FIGURE 11 is a fragmentary, exploded, perspective view of a typical corner structure of the partition construction illustrated in FIGURE 5 in the region of the arrow 11 thereof.

Figures 1, 2, 3:
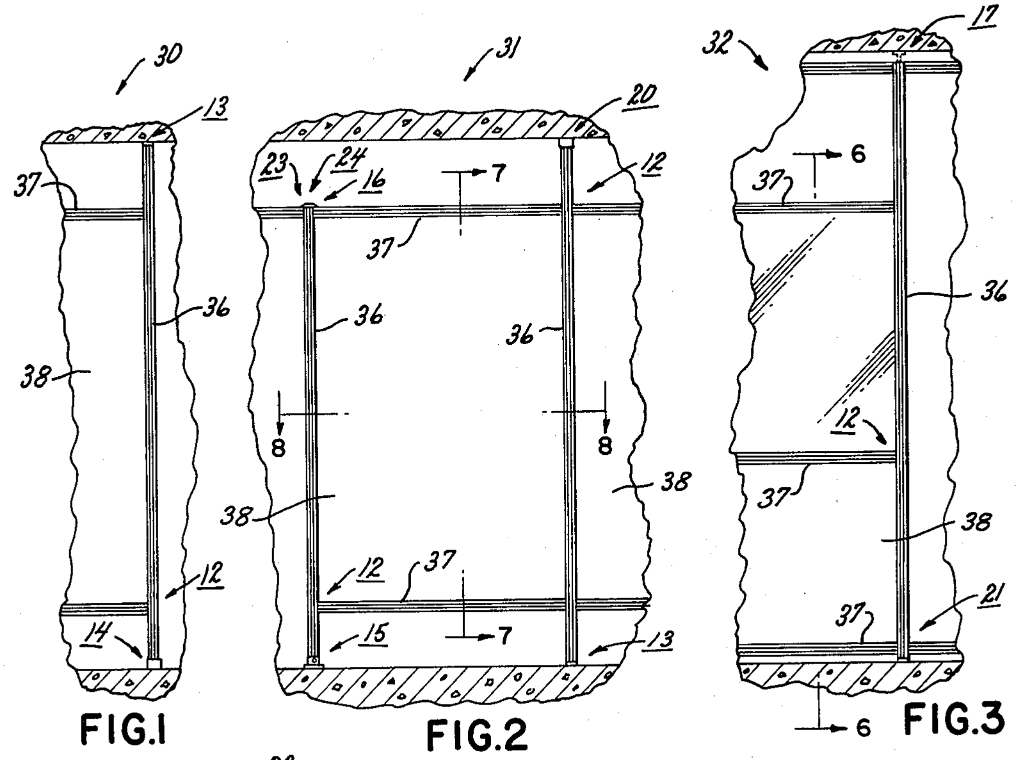
FIGURE 1 is a fragmentary elevation view of one type of panel construction of this invention.
FIGURE 2 is a view similar to FIGURE 1 and illustrates another panel construction of this invention.
FIGURE 3 is a fragmentary elevation view illustrating another type of panel construction of this invention.
Figures 23, 24:
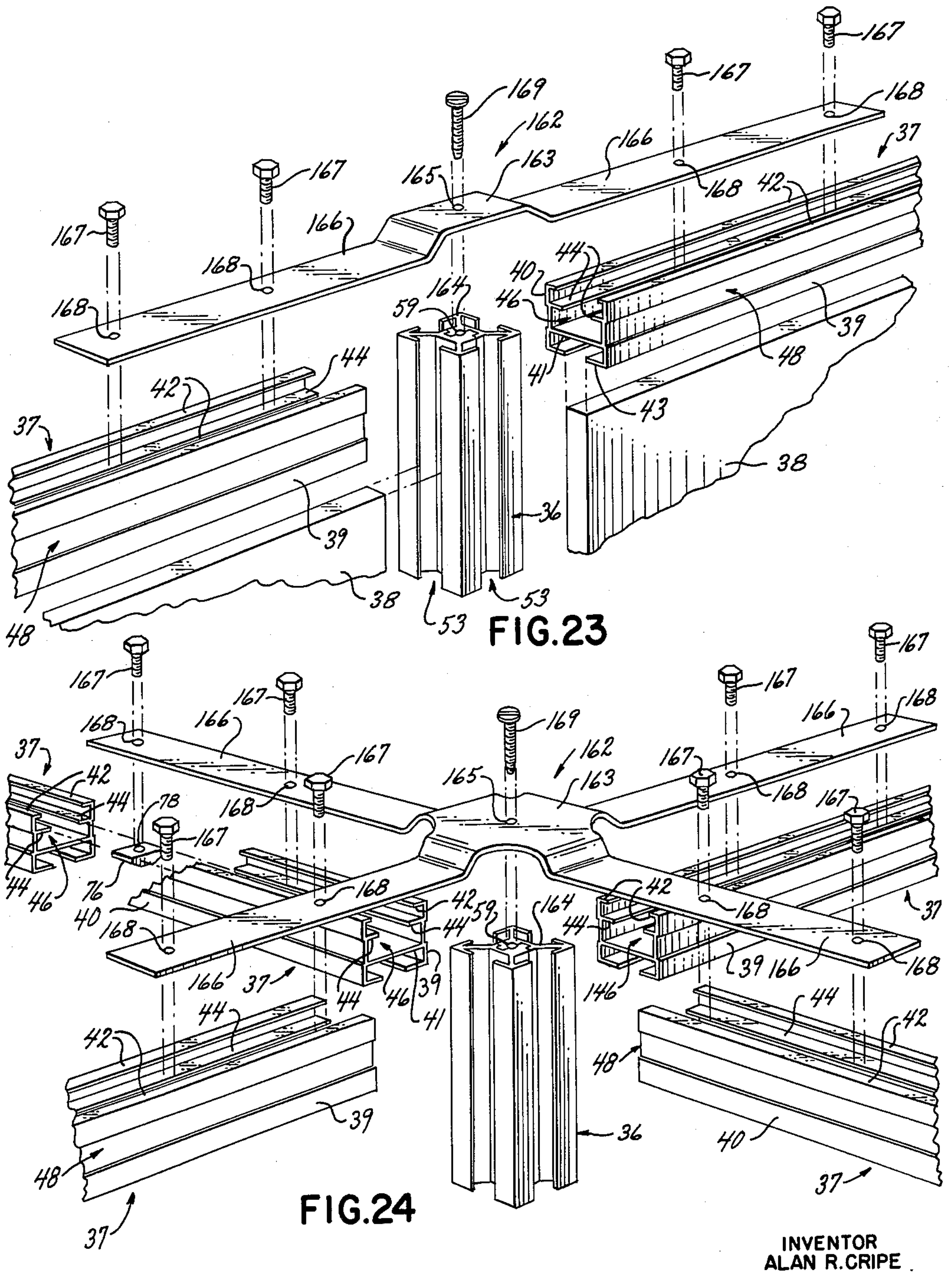

FIGURES 23 and 24 are respectively fragmentary, exploded perspective views of typical constructions forming part of the partition construction illustrated in FIGURE 2 in the regions of the arrows 23 and 24 thereof.

While the various features of this invention are hereinafter described and illustrated as being particularly adaptable for forming partition constructions or the like, it is to be understood that the various features of this invention can be utilized singly or in any combination thereof to form other constructions as desired.

Therefore, this invention is not to be limited to only the embodiments thereof illustrated in the drawings, because the drawings are merely utilized to illustrate one of the wide variety of uses of this invention.

Figure 4:
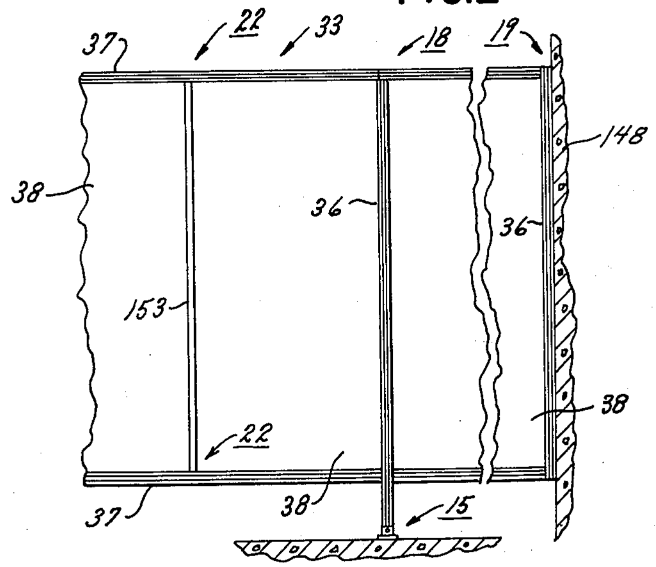
FIGURE 4 is a view similar to FIGURE 3 and illustrates another panel construction of this invention.
Figure 5:
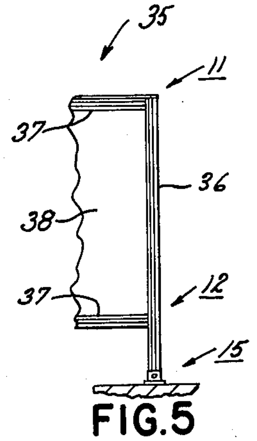
FIGURE 5 is a view similar to FIGURE 4 and illustrates another panel construction of this invention.

Referring now to FIGURES 1–5, the various partition constructions of this invention are respectively, generally indicated by the reference numerals 30–35 and respectively comprise a plurality of partition members 36 interconnected to other partition members 37 in a manner hereinafter described to frame and carry a plurality of panels 38 in a manner hereinafter described whereby the members 36, 37, and 38 can be formed into partition constructions having any desired pattern as is fully illustrated in FIGURES 1 and 5 which merely set forth some of the various examples of this invention.

While the partition members 36 and 37 can be formed of any suitable material and in any suitable manner, the embodiments of the partition members 36 and 37 illustrated in the drawings are formed by extruding metallic material, such as aluminum-containing metallic material or the like, in conventional extruding apparatus.

Figure 6:
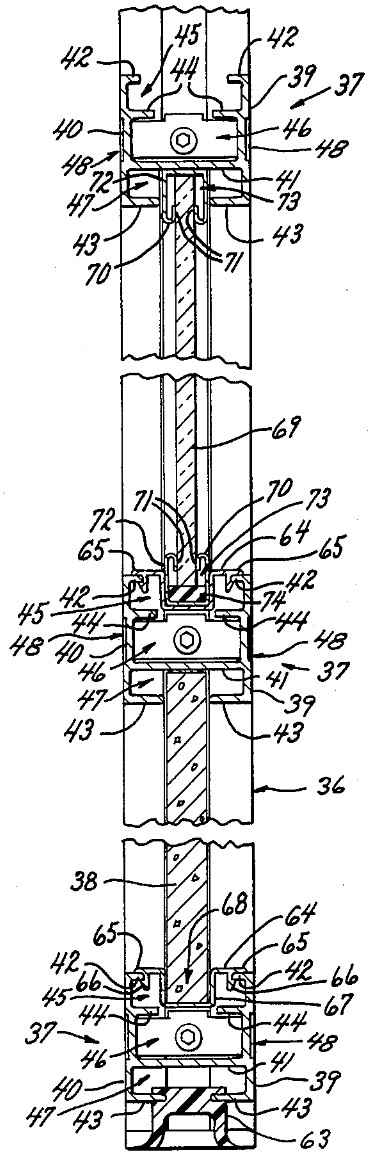
FIGURE 6 is an enlarged, fragmentary cross-sectional view of the panel construction illustrated in FIGURE 3 and is taken on line 6—6 thereof.
Figure 7:
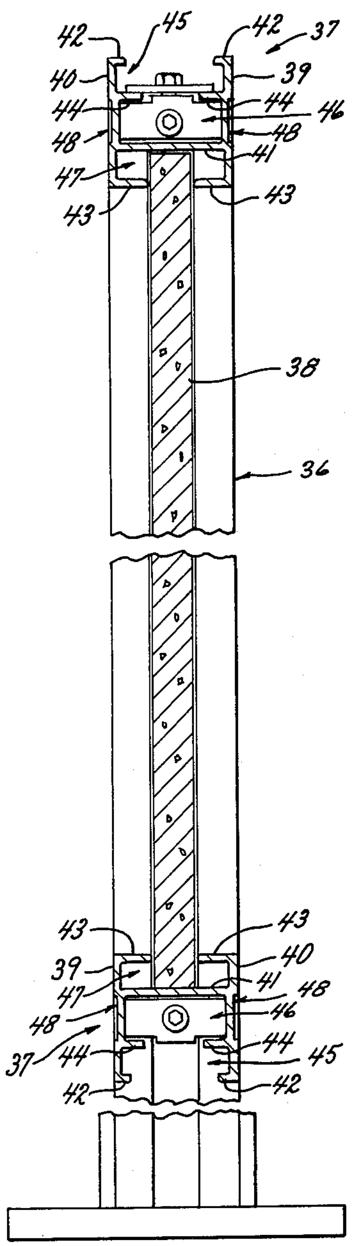
FIGURE 7 is a view similar to FIGURE 6 and is taken on line 7—7 of FIGURE 2.

As illustrated in FIGURES 6 and 7 each partition member 37 comprises a pair of opposed parallel sides 39 and 40 integrally joined together and spaced from each other by an intermediate web portion 41, the sides 39 and 40 respectively having inwardly turned ends 42 and 43 respectively facing each other and being suitably spaced from each other with the turned ends 43 being longer than the turned ends 42 for a purpose hereinafter described.

Each side 39 and 40 of each partition member 37 has an inwardly directed flange 44 disposed intermediate the web 41 and its respective turned end 42, the flanges 44 facing each other and being spaced from each other whereby the turned ends 42 and 43, web 41 and flanges 44 respectively divide each partition member 37 into three channels 45, 46 and 47 utilized in a manner hereinafter described.

If desired, the sides 39 and 40 of each partition member 37 can medially be recessed at 48 for ornamentation purposes or the like.

While the partition members 37 can have any desired dimensions, one embodiment thereof defines a substantially, square, cross-sectional configuration being approximately 1.500 inches on each side thereof with the opening between the turned ends 42 being approximately 1.063 inches, the opening between the flanges 44 being approximately 0.690 of an inch and the opening between the turned ends 43 being approximately 0.540 of an inch. The depth of the channel 45 is approximately 0.320 of an inch, the depth of the channel 46 is approximately 0.540 of an inch and the depth of the channel 47 is approximately 0.320 of an inch.

The partition members 36 are illustrated in FIGURE 8 and each comprises two like elements 49 interconnected together in a manner hereinafter described to define a substantially square central portion 50 having ribs or webs 51 radiating from the corners thereof and carrying right angled arms 52 at the free ends thereof whereby the arms 52 define a substantially square cross-sectional configuration of each partition member 36 and cooperate therewith to define a plurality of truncated triangular channels 53 interconnected to the exterior of the partition member 36 by the spacing between adjacent arms 52 as illustrated in FIGURE 8.

While the partition members 36 are illustrated as being formed from two elements 49, it is to be understood that the same can be formed from a single element if desired.

However, when the frame members 36 are formed from the elements 49, each element 49 is extruded in a conventional extruding apparatus and has a configuration as illustrated in FIGURE 9 wherein the webs 51 are interconnected to a substantially L-shaped portion 54 having an intermediate flat surface 55 interconnected at the opposed ends thereof to oppositely disposed end surfaces 56 and 57 extending at right angles relative thereto.

The intermediate surface 55 of each element 49 is interrupted by a groove 58 which cooperates with the groove 58 in another element 49 to define a substantially circular opening 59 passing centrally through the central section 50 of the respective partition member 36. If desired, the internal peripheral surface defined by the groove 58 of each element 49 can have outwardly directed ribs 60 which lend themselves to being threaded by self-tapping threading members in a manner hereinafter described and for a purpose hereinafter described.

Each end of surface 56 of each element 49 has an outwardly directed flange 61 which is adapted to be received in a channel 62 interrupting the end surface 57 of another element 49.

When it is desired to form a partition member 36 from a pair of elements 49, the elements 49 are cut to the same length and assembled together in the manner illustrated in FIGURE 10 by moving one element 49 relative to the other element 49 until the intermediate surfaces 55 thereof are disposed in abutting relation and the flanges 61 thereon are respectively received in the channels 62 thereof as illustrated in dotted lines in FIGURE 10.

Thereafter, a suitable plug or the like of any desired length is inserted in the resulting opening 59 formed by the mating grooves 58 thereof whereby the members 49 are interlocked together by the means filling the mating grooves 58 and cannot be subsequently pulled apart until such plug is removed.

For example, the plug can comprise a dowel-like pin which is disposed in the opening 59 or can comprise a self-tapping threading member which when rotated in the proper direction threads the ribs 60 thereof while being progressively inserted into the opening 59 to hold the adjacent elements 49 together.

Therefore, it can be seen that the partition members 36 and 37 can be fabricated in a relatively simple manner and can be utilized with other parts of this invention to form the various partition constructions illustrated in FIGURES 1–5 and now to be described.

In particular, reference is made to FIGURES 7 and 8 wherein the vertically disposed partition members 36 are fixed relative to the floor and ceiling construction and the lower horizontal partition member 37 is fastened to the vertically extending partition members 36 in a manner hereinafter described with the channel 47 thereof facing upwardly.

Thereafter, the panel 38 formed of any suitable material and in any suitable manner, such as comprising a gypsum board or the like of approximately 0.500 of an inch thick, and having an overall length greater than the distance between adjacent arms 52 of the vertically disposed partition members 36, is inserted in the facing channels 53 of the vertically disposed partition members 36 by first angularly disposing one end edge of the panel 38 fully into one of the channels 53 of one of the members 36 as illustrated in dotted lines in FIGURE 8 and thereafter pivoting the panel 38 into the position illustrated in full lines in FIGURE 8 and moved axially toward the right hand partition member 36 until the same assumes the position illustrated in full lines in FIGURE 8.

Subsequently, panel 38 can be lowered vertically downwardly into the channel 47 of the lower horizontal partition member 37 until the end edge thereof rests on the web 41 thereof.

Thereafter, the upper horizontal partition member 37 can have the channel 47 thereof telescoped over the upper edge of panel 38 in the manner illustrated in FIGURE 7 and be subsequently fastened to the vertically disposed partition members 36 in a manner hereinafter described.

Therefore, it can be seen that it is relatively simple to frame the panel members 38 by the frame members 36 and 37 to provide a desired partition construction.

Should it be desired to form the partition construction 32 illustrated in FIGURE 6, the vertically disposed partition members 36 are placed relative to the floor and ceiling in a manner hereinafter described and the lower horizontally disposed partition member 37 is fastened thereto with the channel 45 thereof facing upwardly while a rubber gasket 63 has an end thereof disposed in the channel 47 and interconnected to the turned ends 43 in the manner illustrated in FIGURE 6, the rubber gasket 63 engaging the floor to provide a seal between the partition construction 32 and the floor of the desired building structure.

Figures 12, 13, 14, 15:
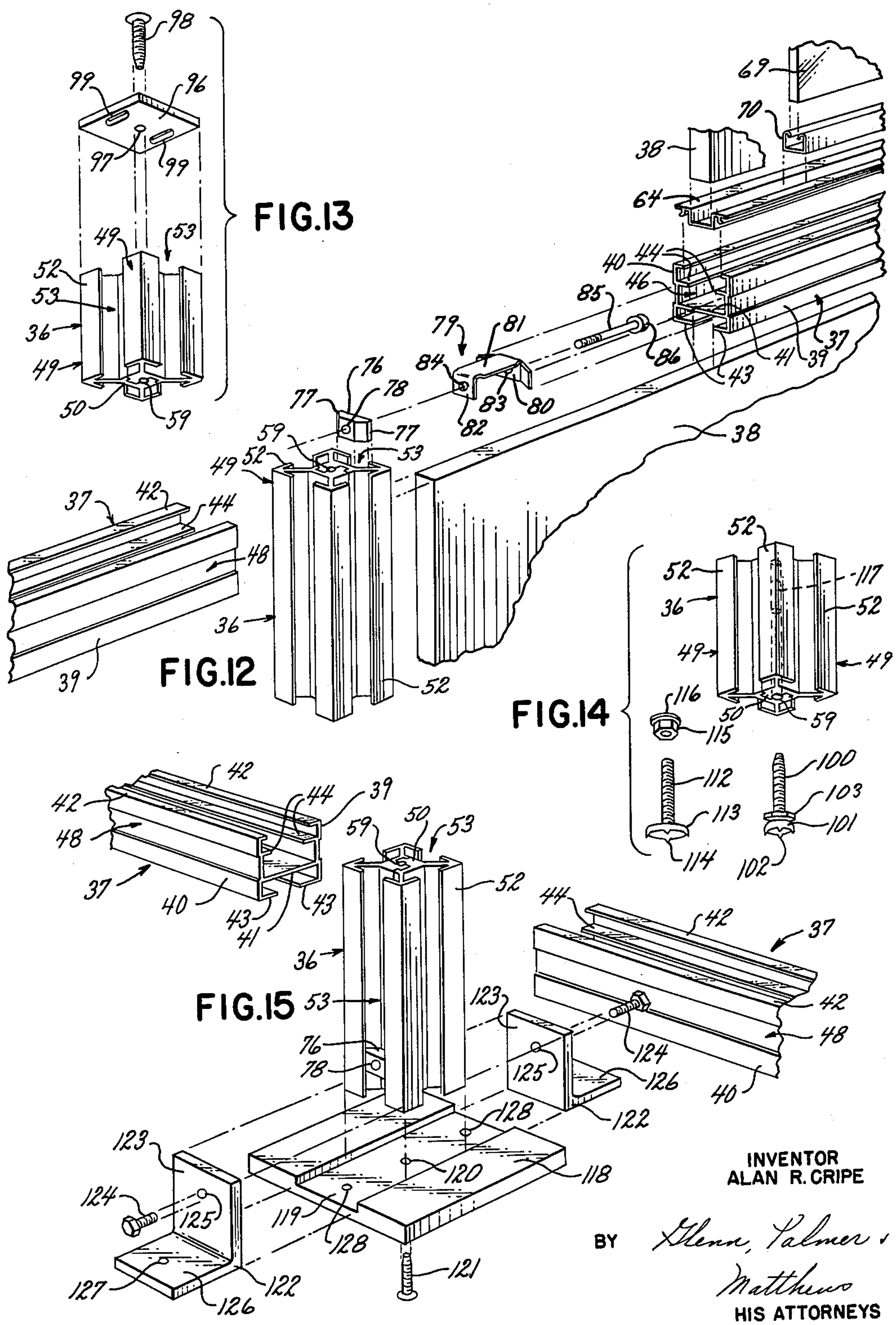
FIGURE 12 is a fragmentary, exploded, perspective view of a portion of the partition constructions illustrated in FIGURES 1, 2, 3, and 5 and taken in the region of the arrows 12 thereof.
FIGURE 13 is a fragmentary, exploded, perspective view of a portion of the partition constructions illustrated in FIGURES 1 and 2 and taken in the region of the arrows 13 thereof.
FIGURE 14 is a view similar to FIGURE 13 and illustrates a portion of the partition construction of FIGURE 1 in the region of the arrow 14 thereof.
FIGURE 15 is a fragmentary, exploded, perspective view illustrating a portion of the partition constructions illustrated in FIGURES 2, 4, and 5 in the region of the arrows 15 thereof.

Thereafter, a retainer 64, FIGURES 6 and 12, is inserted into the channel 45 of the lower horizontal partition member 37 in the manner illustrated in FIGURE 6 whereby opposed flanges 65 and 66 of the retainer 64 are disposed on opposite sides of the turned ends 42 to hold the retainer 64 relative to the partition member 37, the flanges 66 being cam-snapped into place by merely pushing vertically downwardly on the clip 64 until the flanges 66 clear the ends 42 and spring outwardly to hold the retainer to the partition member 37.

The retainer 64 has a cup-shaped portion 67 defining an outwardly facing channel 68 having a width slightly greater than the width of the panel 38 received therein, the lower edge of the panel 38 bearing against the bottom of the cup-shaped portion 67 of the retainer 64 whereby the retainer 64 properly positions the panel 38 relative to the lower horizontal partition member 37.

Thereafter, the intermediate horizontal partition member 37 is telescoped over the upper edge of the lower panel 38 and secured to the vertically disposed partition members 36 in a manner hereinafter described.

Since it is desired to mount a relatively thin pane of glass 69 above the lower panel 38, another retainer 64 is secured to the intermediate horizontal partition member 37 in the manner previously described and a substantially U-shaped clip 70, FIGURES 6 and 12, is disposed in the channel 68 of the clip 64 in the manner illustrated in FIGURE 6, the clip 70 having reversely turned free ends 71 on the legs 72 thereof which are adapted to respectively engage the opposed surfaces of the pane of glass 69 when the same is disposed in the outwardly facing channel 73 of the clip 70.

Before the lower edge of the pane of glass 69 is inserted in the lower clip 70, a resilient gasket or bumper 74 is disposed in the channel 73 and rests on the cross member 75 of the lower clip 70 so that the lower edge of the glass 69 can rest on the bumper 74 to prevent chipping of the pane of glass 69.

After the pane of glass 69 has been disposed in the intermediate horizontal partition member 37 in the above manner, another clip 70 is telescoped over the upper edge thereof as illustrated in FIGURE 6 so that the top horizontal partition member 37 can be subsequently telescoped over the upper clip 70 and subsequently secured to the vertically disposed partition members 36 in a manner hereinafter described.

In particular, reference is now made to FIGURE 12 illustrating the joint construction between the horizontally disposed partition members 37 and the vertically disposed partition members 36 of the partition construction of FIGURES 1, 2, 3, and 5.

Each horizontally disposed partition member 37 is angularly disposed relative to and has one end thereof abutting one side of a vertically disposed partition member 36 whereby a channel 53 of the vertically disposed partition member 36 is aligned with the intermediate channel 46 of the abutting partition member 37.

A nut-like member 76 having a substantially truncated triangular cross-sectional configuration is adapted to be suitably received in the channel 53 of the partition member 36 whereby the nut-like member 76 has the opposed ends 77 thereof disposed behind the adjacent arms 52 of the partition member 36, the nut-like member 76 having a threaded aperture 78 passing transversely therethrough.

A retaining clip 79 of this invention is adapted to be disposed in the channel 46 of a partition member 37 and comprises a substantially bowed portion 80 interconnected to an arm 81 having a turned end 82, the bowed portion 80 and turned end 82 respectively having apertures 83 and 84 formed therein and aligned with each other to receive a bolt 85 having an enlarged head 86 which is adapted to bear against the convex side of the bowed portion 80.

After the nut-like member 76 has been disposed in the appropriate channel 53 of the partition member 36 and the clip 79 and its inserted bolt 85 are disposed in the intermediate channel 46 of the partition member 37, the end of the partition member 37 is brought against the appropriate side of the partition member 36 and the bolt 85 is threaded into the aperture 78 of the nut-like member 76 with the turned end 82 of the arm 81 abutting the nut-like member 76.

Upon tightening of the bolt 85 in the proper direction, the enlarged head 86 of the bolt 85 bears against the bowed portion 80 of the clip 79 and draws the nut-like member 76 against the inside surfaces of the arms 52 because the turned end 82 of the clip 79 bears against the nut-like member 76 preventing movement of the bowed like portion 80.

In this manner, the opposed ends of the horizontally disposed partition member are secured to adjacent vertically disposed partition members 36 and cannot be removed therefrom because the clips 79 are respectively secured to the partition members 36 and respectively extend into the channel 46 of the partition member 37 at each end thereof.

The clips 79 are bowed at 80 so that the convex side thereof can be readily inserted in the channels 46 of the partition members 37 between the webs 41 and flanges 44 thereof.

Therefore, it can be seen that the clips 79 of this invention can be readily utilized to interconnect the various partition members 36 and 37 of this invention together to form any of the partition constructions illustrated in FIGURES 1–5 and other partition constructions having other desired patterns in a relatively simple manner.

When it is desired to have a plurality of panels 38 disposed at right angles relative to each other and not have that particular portion of the partition construction extend to the ceiling, the partition members of this invention can be formed in the manner indicated by the arrow 11 in FIGURE 5 and illustrated in FIGURE 11.

In particular, the desired number of upper horizontally disposed partition members 37 can be interconnected to the vertically extending partition member 36 by the clips 79 of this invention in the manner set forth above to hold the panels 38 in place. Thereafter, the upper horizontally disposed partition members 37 can have the upwardly facing channels 45 thereof closed by suitable members.

For example, extruded, metallic closure members 87 of this invention can be utilized, each member 87 comprising a flat top portion 88 having a pair of inwardly set and downwardly directed flanges 89 provided with outwardly directed beads 90 adapted to be snap fitted beyond the turned ends 42 of the respective partition member 37 while the flat portion 88 thereof completely spans the spacing between the turned ends 42 and rests on top of the same. In this manner, the beads 90 grip the undersurface of the turned ends 42 to hold the members 87 in place to close the upper surfaces of the upper partition members 37.

Similarly, a suitable plate 91 can be utilized to cover the upper end of the vertically extending partition member 36, the plate 91 having a suitable bore 92 passing centrally therethrough and counterbored at 93 to countersink an enlarged head 94 of a threaded member 95.

The threaded member 95 can be a self tapping member whereby the member 95 not only secures the plate 91 to the vertically extending partition member 36 and be threadedly received in the opening 59 thereof, but also the threaded member 95 can cut threads in the opening 59 and provide the means for securing the elements 49 together without utilizing auxiliary dowel-like pin means.

The vertically disposed partition members 36 can have the opposed ends thereof respectively secured to the floor and the ceiling structure of the desired building construction in the manner illustrated in FIGURE 13.

In particular, a plate-like member 96 having a bore 97 passing centrally therethrough is adapted to be completely superimposed on one of the ends of the vertically disposed partition member 36 and be secured thereto by a threaded member 98 being threadedly received in the opening 59 of the partition member 36, the threaded member 98 providing the sole means for interconnecting together the elements 49 in the manner previously described, if desired.

The plate-like member 96 has a pair of elongated slots 99 passing transversely therethrough which are accessible through cooperating channels 53 of the partition member 36 after the plate 96 has been secured to the partition member 36.

In this manner, after the plate-like member 96 has been secured to the partition member 36 by the fastening member 98, the respective end of the partition member 36 can be disposed in abutting relation against the ceiling or the floor and suitable fastening members can be driven through the slots 99 into the ceiling or floor structure to hold the post 36 in a fixed position relative thereto.

Alternately, the posts or partition members 36 can be held relative to the floor and ceiling structure in the manner illustrated in FIGURE 14 wherein a threaded member 100 has an enlarged head 101 provided with outwardly extending pointed tangs 102, the threaded member 100 being adapted to be received in the opening 59 at the end of the partition member 36 to hold the elements 49 together, if the member 100 is self tapping. By adjusting the telescoping relation between the threaded member 100 and the partition member 36, the enlarged head 101 can be pushed against the supporting structure of either the floor or ceiling and the cleats 102 thereof can be imbedded into such structure to hold the post 36 in a fixed position relative thereto, a suitable nut 103 being carried by the threaded member 100 to bear against the end of the post 36 after the threaded member 100 has been adjusted relative thereto to hold the threaded member 100 in its adjusted position.

Figures 20, 21, 22:
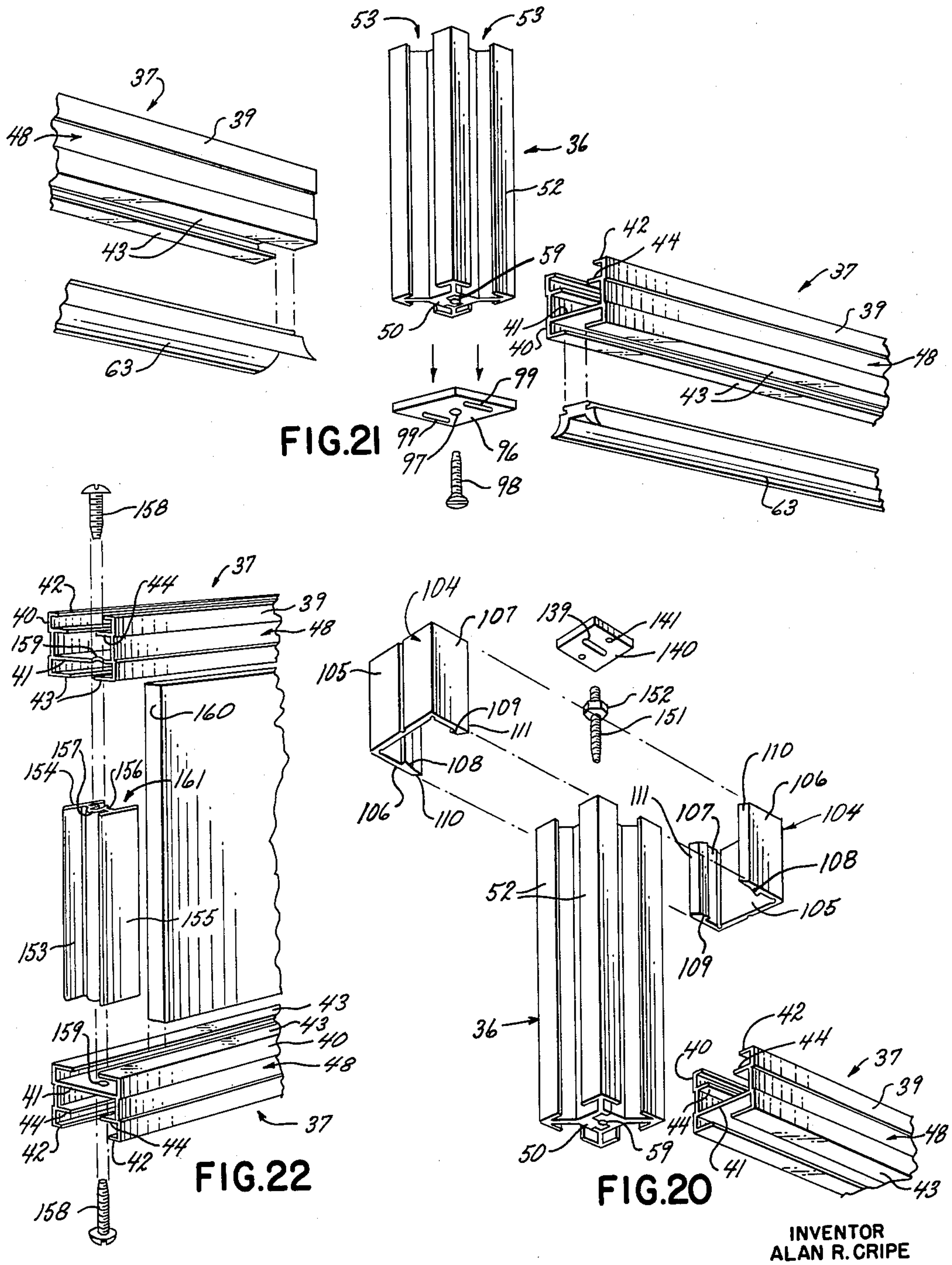
FIGURE 20 is an exploded, fragmentary, perspective view taken in the region of the arrow 20 of FIGURE 2.
FIGURE 21 is a fragmentary, exploded, perspective view taken in the region of the arrow 21 of FIGURE 3.
FIGURE 22 is a view similar to FIGURE 21 and is taken in the region of the arrows 22 in FIGURE 4.

After the threaded members 100 have been utilized to secure the post 36 to the desired structure, the threaded members 100 can be encased by members 104 of this invention and illustrated in FIGURE 20.

In particular, each member 104 is substantially U-shaped and is provided with a flat cross member 105 having a pair of legs 106 and 107 interconnected to the opposed ends thereof, the leg 106 having an inwardly directed flange 108 adapted to hook around one of the arms 52 of the partition member 36 and the leg 107 having an inwardly directed flange 109 adapted to hook around an oppositely disposed arm 52 of the partition member 36 to hold that member 104 to a particular partition member 36. The leg 106 of each member 104 has a beveled free end 110 while the leg 107 thereof has an oppositely directed beveled free end 111 whereby a pair of members 104 are adapted to be interconnected to opposite halves of a respective partition member 36 with one of the members 104 inverted relative to the other member so that the beveled surface 111 of one of the members 104 will be disposed adjacent the beveled surface 110 of the other member 104 when the same are interconnected to the partition member 36. The members 104 are secured to the particular partition member 36 in such a manner that the ends of the members 104 extend beyond the end of the partition member 36 to abut the ceiling or floor structure to completely encase the fastening member 100 therein as illustrated at the reference numeral 14 in FIGURE 1.

Returning now to FIGURE 14, instead of utilizing a self tapping threaded member 100, another threaded member 112 can be utilized which does not thread the opening 59 of the partition member 36 but is readily receivable therein, the threaded member 112 having enlarged end 113 provided with the outwardly extending cleats 114 to be utilized in the manner previously described. A nut 115 and washer 116 are adapted to be telescopically disposed on the threaded member 112 to limit the degree of insertion of the threaded member 112 into the opening 59 at the respective end of a partition member 36, the partition member 36 being formed by a dowel-like pin means 117 being disposed in the opening 59 to hold the elements 49 together in the manner previously discribed.

If desired, the vertically extending partition members 36 can be mounted on the floor structure in the manner illustrated in FIGURE 15 and indicated by the arrow 15 in FIGURE 4.

In particular, a plate-like member 118 is provided with a longitudinally disposed recess 119 in the upper face thereof and of a width sufficient to receive the lower end of a particular partition member 36, the plate-like member 118 having a central aperture 120 passing therethrough whereby a fastening member 121 is adapted to pass through the aperture 120 into the opening 59 of the particular partition member 36 received in the recess 19 thereof to hold the plate-like member 118 to the partition member 36.

Thereafter, a pair of L-shaped brackets 122 each having one leg 123 thereof secured to the post 36 by bolts 124 passing through apertures 125 and received in the threaded members 76 disposed in the appropriate channels 53 of the partition member 36, the other leg 126 of each L-shaped bracket 122 being received in the recess 119 with the upper surface thereof flush with the upper surface of the plate 118 and bracket 122 being secured to the plate-like member 118 by suitable fastening members (not shown) passing through apertures 127 formed in the L-shaped members 122 and through apertures 128 formed in the plate-like member 118. If desired, such fastening members can be embedded into the floor structure to hold the plate-like structure 118 in a fixed position relative thereto whereby the particular post 36 interconnected to the plate-like member 118 is also held fixed to the floor structure.

Thereafter, the horizontally disposed partition members 37 can be interconnected to the post 36 in the manner previously described.

Figure 16:
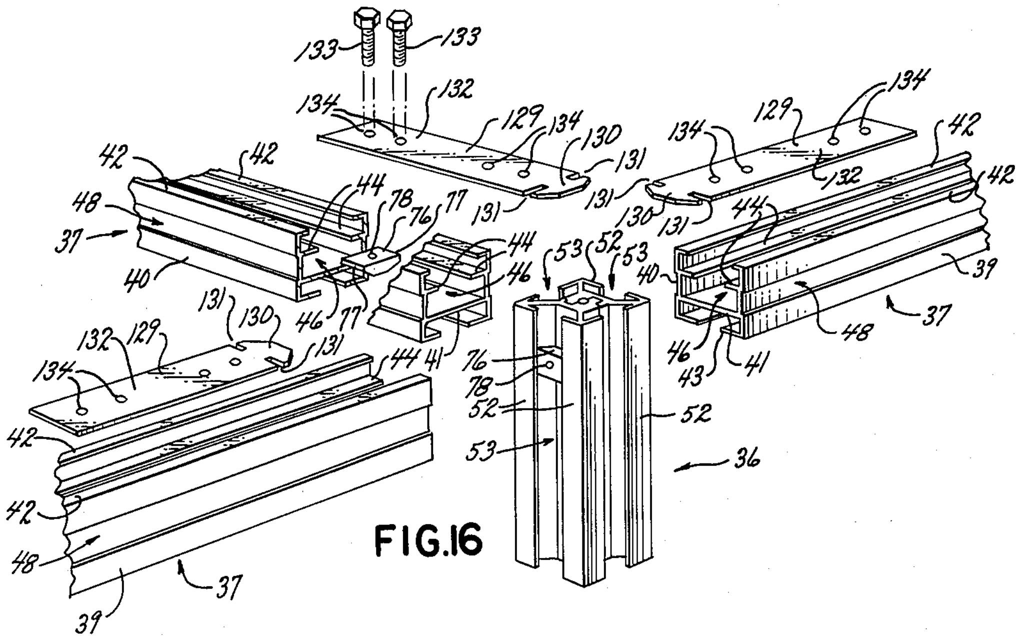
FIGURE 16 is a view similar to FIGURE 15 and illustrates one typical portion of the partition construction of FIGURE 2 in the region of the arrow 16 thereof.

When the horizontally disposed partition members 37 are interconnected to the vertically disposed partition members 36 by the spring clips 79 in the manner previously described and illustrated in FIGURE 12, such horizontally disposed partition members 37 can be further secured thereto by brackets 129 of this invention and illustrated in FIGURE 16. Particularly, such brackets 129 are utilized to strengthen the joint structure between the upper horizontally disposed partition members 37 forming part of the partition construction 31 in the region of the reference numeral 16 of FIGURE 2.

Each bracket 129 comprises a flat metal structure having one portion 130 thereof contoured at the free end thereof and notched at 131 so that the end 130 is readily receivable in a channel 53 of a partition member 36 whereby the adjacent arms 52 of the partition member 36 are received in the notches 131 so that the end 130 of the plate-like member 129 is interlockingly interconnected to the particular partition member 36.

The other end 132 of the bracket 129 is fully receivable between the turned ends 42 of the partition member 37 and are adapted to rest on the flanges 44 thereof.

To secure the plate-like member 129 to a particular horizontally disposed partition member 37, a plurality of nut-like members 76 are disposed in the channel 46 of the partition member 37 whereby the nut-like members 76 rest on the webs 41 and cannot be pulled vertically upwardly because the flanges 44 extend over the ends 77 of the nut-like members 76.

Thereafter, a plurality of fastening means 133 are passed through suitable apertures 134 formed in the plate-like members 129 to be received in the apertures 78 of the nut-like members 76 to secure the brackets 129 to the horizontally disposed partition members 37.

Therefore, it can be seen that the plate-like members 129 can be utilized with the clips 79 to securely fasten the horizontally disposed partition members 37 to the vertically disposed partition members 36.

When it is desired to completely partition a room between the floor and ceiling thereof as illustrated in FIGURE 3, the upper horizontally disposed partition members 37 may not be adapted to be disposed flush against the ceiling structure because of irregularities in the ceiling structure.

Figure 17:
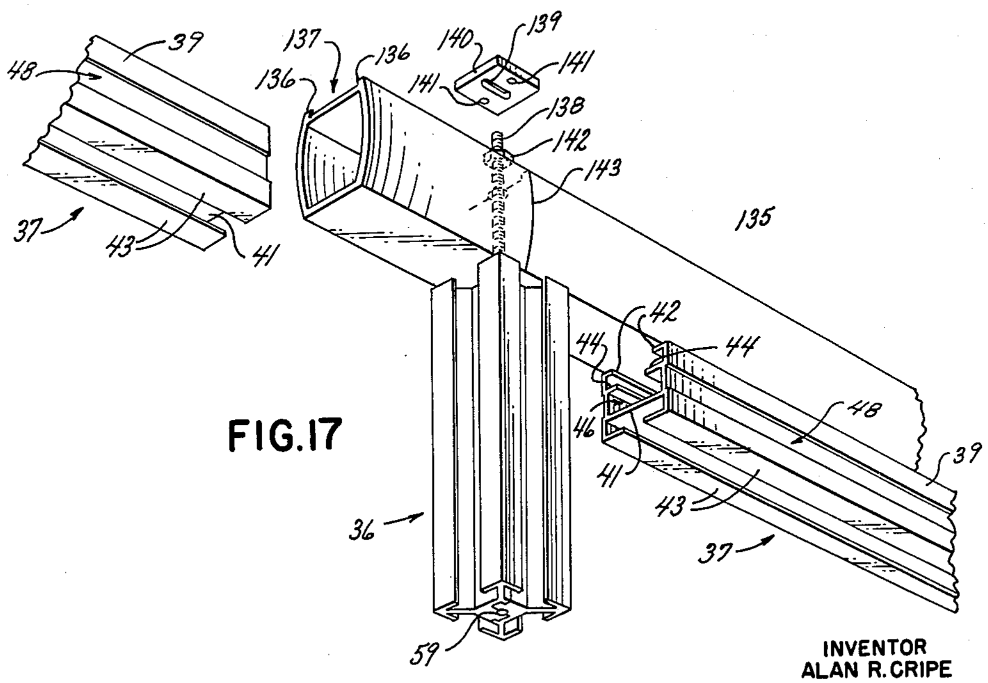
FIGURE 17 is a view similar to FIGURE 15 and is taken in the region of the arrow 17 in FIGURE 3.

Therefore, it is sometimes desirable to utilize a flexible gasket-like member 135, FIGURE 17, between the ceiling structure and the adjacent horizontally disposed partition members 37 to fill all voids therebetween.

In particular, the gasket-like member 135 can be formed of vinyl plastic or the like and can comprise a hollow, substantially rectangular tube having upwardly directed flanges 136 on the upper end thereof to define a recess 137.

The gasket-like member 135 can be placed between the upper end of the vertically extending partition members 36 and between the horizontally disposed partition member 37 and the ceiling construction after the horizontally disposed partition members 37 are secured to the vertically disposed partition members 36 in the manner illustrated in FIGURE 12.

A threaded member 138 projects outwardly from the opening 59 of the upper end of the vertically extending partition member 36 and is received in an elongated slot 139 formed in a plate-like member 140 adapted to be secured to the ceiling structure by suitable fastening means passing through apertures 141 thereof, the threaded member 139 carrying a nut 142 for securing the plate-like member 139 to the threaded member 138.

Thereafter, the gasket-like member 135 is partially split at 143 so as to be telescoped over the projecting portion of the threaded member 138 between the plate-like member 140 and the upper end of the post 36 and into the position illustrated in FIGURE 17 whereby the plate-like member 140 is received in the recess 137 of the gasket 135, the gasket 135 also being pushed between the ceiling structure and the upper horizontally disposed partition members 37.

Since the gasket-like member 135 is resilient, the same can fill all the voids between the ceiling structure and the horizontally disposed partition members 37 regardless of irregularities in the ceiling structure.

Figure 18:
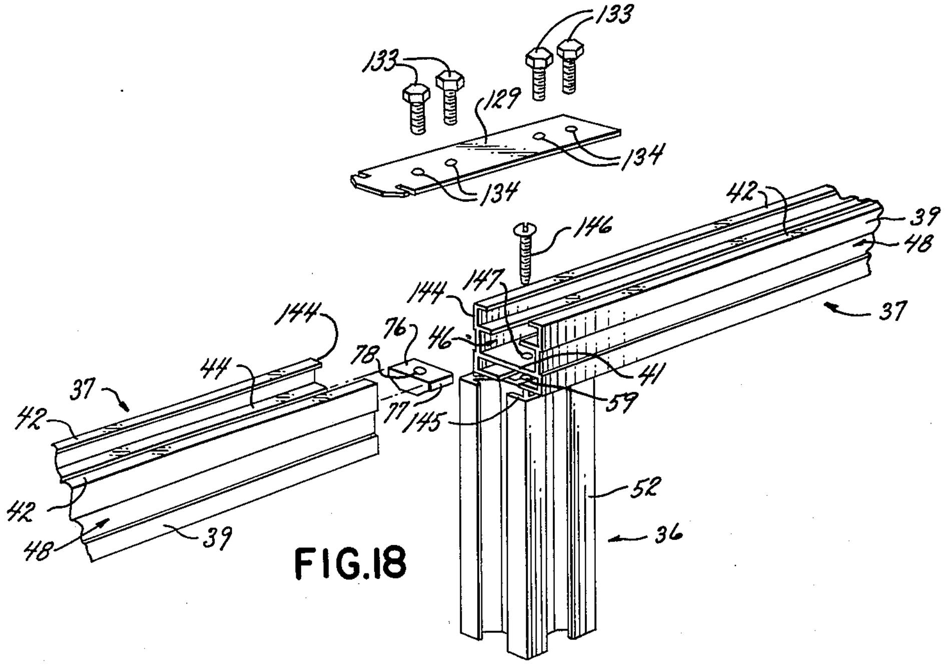
FIGURE 18 is an exploded, fragmentary, perspective view illustrating a portion of the partition construction of FIGURE 4 in the region of the arrow 18 thereof.

When it is desired to have the upper horizontally disposed partition members 37 rest on top of the vertically disposed partition members 36 in the manner illustrated in the region of the reference numeral 18 of FIGURE 4, adjacent horizontally disposed partition members 37 can have adjacent, abutting ends thereof disposed on top of the upper end of a vertically extending partition member 36 in the manner illustrated in FIGURE 18 and joined together in the manner now to be described.

In particular, the horizontally disposed partition members 37 are so cut that the respective ends 144 thereof rest on top of the end 145 of the vertically extending partition member 36 with the ends 144 disposed in abutting relation and overlapped by the end 145 of the partition member 36.

Thereafter, the adjacent partition members 37 can be joined together by the plate-like bracket 129 of this invention by having the left hand apertures 134 thereof disposed over the left hand partition member 37 and the right hand apertures 134 disposed over the right hand partition member 37 whereby the plate-like member 129 can be respectively joined to the adjacent partition members 37 by the bolts 133 being received in the nut-like members 76 respectively disposed in the channels 46 of the adjacent partition members 37.

Preferably, one of the partition members 37 extends over a major portion of the end 145 of the end 145 of the vertically disposed partition member 36 so that a suitable fastening member 146 can pass through an aperture 147 formed in web 41 of that particular partition member 37 and into the opening 59 in the upper end 145 of the vertically disposed partition member 36 to secure that partition member 37 to the partition member 36.

Figure 19:
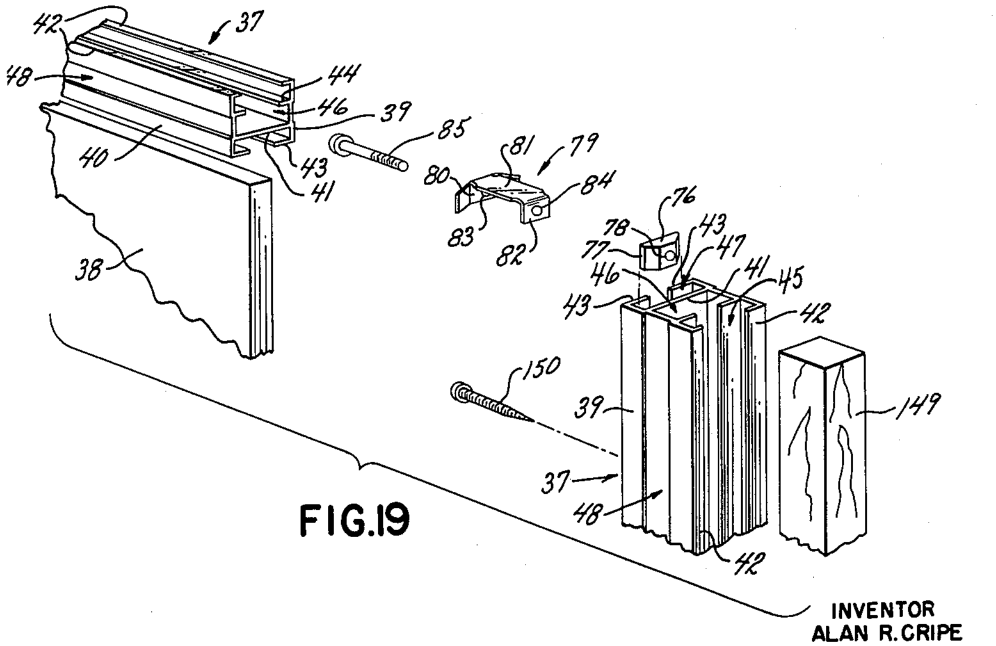
FIGURE 19 is a view similar to FIGURE 18 and is taken in the region of the arrow 19 of FIGURE 4.

When it is desired to join a particular partition construction against a vertically disposed wall of the particular building structure, the same can be formed in the manner illustrated by the reference numeral 19 in FIGURE 4 and illustrated in FIGURE 19 by having the vertically disposed partition member, which abuts the vertically disposed wall structure 148, formed from a partition member 37.

In particular, the vertically disposed end partition member 37 is adapted to be secured to the studding 149 of the wall structure 148 by having suitable screw-like members 150 passing through suitable apertures formed in the web 41 of the vertically disposed partition member 37 and through the channels 46 and 45 thereof into the studding 149 to hold the vertically disposed partition member 37 against the wall 148.

Thereafter, the horizontally disposed partition members 37 can be secured to the vertically disposed partition member 37 by the spring clips 79 in substantially the same manner as illustrated in FIGURE 12 by having the nut-like members 76 disposed in the channel 47 of the vertically disposed partition member 37, the turned ends 43 of the partition member 37 holding the nut-like members 76 in place.

Referring now to FIGURE 20, the vertically disposed partition members 36 can be joined to the ceiling structure by plate-like members 140 similar to those illustrated in FIGURE 17 by threaded members 151 disposed in the opening 59 of the upper end of the vertically disposed partition members 36 and being received in the elongated slot 139 thereof, a suitable nut-like member 152 being carried by the threaded member 151 to hold the plate-like member 140 in the proper position on the threaded member 151. The plate-like member 140 is in turn secured to the ceiling structure by suitable fastening members passing through the apertures 141 thereof in the manner previously described.

Thereafter, the spacing between the ceiling structure and the upper end of the post 36 can be filled by the members 104 extending between the ceiling structure and overlapping a portion of the upper end of the vertically disposed partition member 36 in the manner previously described.

Therefore, it can be seen that the fastening members 151 are completely enclosed by the cover members 104 in the manner illustrated by the reference numeral 20 in FIGURE 2.

As previously stated, the plate-like members 96 illustrated in FIGURE 13 can be utilized to secure the lower ends of the vertically disposed partition members 36 to the floor structure, FIGURE 21, by having suitable fastening members passing through the elongated slots 99 thereof into the floor structure, the plate-like member 96 being secured to the lower end of the post 36 by the fastening member 98 being received through the aperture 97 of the plate-like member 96 into the opening 59 of the post 36.

Further, the lower horizontally disposed partition members 37 can be secured to the post 36 of FIGURE 21 by the clips 79 in the manner previously described and the gaskets 63 as illustrated in FIGURE 6 can be carried by the lower horizontally disposed partition members 37 and extend to the floor structure as desired.

When it is desired to provide various panels 38 between adjacent vertically disposed posts 36 in the manner illustrated at the reference numeral 22 in FIGURE 4, another partition member 153 of this invention is utilized, as best illustrated in FIGURE 22, and comprises a substantially H-shaped structure having opposed sides 154 and 155 medially joined together by a cross member 156 having a substantially semi-circular portion 157 adapted to receive threaded members in a manner hereinafter described.

The partition members 153 are so cut that the opposed ends thereof are adapted to extend between the upper and lower horizontally disposed partition members 37 in the manner illustrated in FIGURE 22 whereby suitable threaded fastening members 158 are adapted to pass through suitable apertures 159 formed in the webs 41 of the partition members 37 and be threadedly received in the semicircular portion 157 thereof to interconnect the partition members 153 between the upper and lower horizontally disposed partition members 37.

In this manner, the side edges 160 of the various panel structures 39 can be received in a respective channel 161 defined by the sides 154 and 155 and the cross member 156 of the partition member 153.

When it is desired to interconnect a plurality of horizontally disposed partition members 37 to the upper end of a vertically disposed partition member 36 which does not extend all the way to the ceiling structure as illustrated by the reference numerals 23 and 24 in FIGURE 2, various retainers of this invention can be utilized in the manner illustrated in FIGURES 23 and 24.

In particular, reference is made to FIGURE 23, wherein a retainer 162 has a cap portion 163 adapted to be superimposed over the upper end 164 of the particular vertically disposed partition member 36 and be secured thereto by a threaded member 169 passing through a suitable aperture 165 in the cap portion 163 and being received in the opening 59 in the end 164 of the partition member 36 whereby the retainer 162 is secured to the partition member 36.

The cap portion 163 of the retainer 162 has a plurality of arms 166 extending outwardly therefrom, each arm 166 being so constructed and arranged that the same is adapted to pass between the turned ends 42 of a particular horizontally disposed partition member 37, interconnected to the post 36 by the aforementioned clips 79, and be received on top of the flanges 44 thereof. The particular arm 166 of the retainer 162 can be secured to the respective horizontally disposed partition member 37 by a plurality of bolts 167 passing through suitable apertures 168 formed in the arm 166 and being received in the nut-like members 76 disposed in the channels 46 of the particular partition member 37.

In this manner, the retainer 162 further assists the clips 79 in securing the upper horizontally disposed partition members 37 to the upper end of the vertically extending partition member 36 which is not attached to the ceiling structure or the like.

While FIGURE 23 illustrates a retainer 162 having only two arms 166 disposed in coplanar relation to interconnect together a pair of coplanar partition members 37 to a vertically disposed partition member 36, it is to be understood that the retainers 162 of this invention can have any desired number of arms 166. For example, the retainer 162 illustrated in FIGURE 24 has four such arms 166 each functioning in the manner previously set forth.

Therefore, it can be seen that this invention provides a plurality of improved parts for forming a partition construction of any desired configuration, as exemplified by FIGURES 1–5 whereby the particular partition construction can be formed from a relatively few parts in a relatively simple manner to properly hold desired panels in desired relation relative to each other.

Further, such partition constructions can be readily disassembled should it be desired to rearrange the spacing in the building construction because the various partition members of this invention are secured together by readily disconnectable means.

While the form of the invention now preferred has been disclosed as required by the statutes, other forms may be used, all coming within the scope of the claims which follow.

What is claimed is:

1. In a partition construction or the like, a first partition member having a central portion provided with a substantially square cross-sectional configuration and a plurality of radially disposed flanges extending from the corners thereof and carrying right-angled arms at the free ends thereof to define outward facing channels respectively having substantially truncated triangular configurations, said first partition member being formed of a plurality of parts, a plurality of second partition members each having opposed sides respectively provided with inwardly turned ends and interconnected together by an intermediate web that cooperates with said turned ends to define channels therein, said second partition members being angularly disposed relative to and abutting said first partition member with the tops of all of said partition members being coplanar and with one of the channels of each of said second partition members facing upwardly, and a retainer having a cap portion superimposed over the top of said first partition member and being secured thereto by a first fastening means, said retainer having segments extending downwardly from said cap portion, said retainer having outwardly directed offset arms interconnected to said segments and being parallel with said cap portion, said arms being received in said upwardly facing channels of said second partition members and being secured to said second partition members by second fastening means whereby said first partition part is held between said downwardly extending segments of said retainer.

2. In combination, a plurality of first partition parts each having a channel therein, a pair of identical members forming a second partition part and each having a flat intermediate surface interconnected to a pair of oppositely disposed flat end surfaces extending at right angles relative to said intermediate surface, each intermediate surface abutting the other intermediate surface and having a groove cooperating with the groove of the other member to define an opening passing between said members, one of said end surfaces of each member abutting the other end surface of the other member and having an outwardly directed flange, the other end surface of each member having a channel receiving said flange of the other member, said first partition parts being angularly disposed relative to and abutting said second partition part with the tops of all of said partition parts being coplanar and with said channels of said first partition parts facing upwardly, and a retainer having a cap portion superimposed on said top of said second partition part and being secured thereto by first fastening means being disposed in said opening of said second partition part, said retainer having segments extending downwardly from said cap portion, said retainer having outwardly directed offset arms interconnected to said segments and being disposed parallel with said cap portion, said arms being received in said upwardly facing channels of said first partition parts and being secured thereto by second fastening means whereby said second partition part is held between said downwardly extending segments of said retainer.

3. In the combination set forth in claim 2, said first fastening means comprising a threaded member that internally threads said opening of said second partition part.

4. In combination, a plurality of first partition parts each having a channel therein, a pair of identical members forming a second partition part and each having a substantially L-shaped portion cooperating with the other L-shaped portion to define a substantially rectangular central structure, each member having a flat intermediate surface interconnected to a pair of oppositely disposed flat end surfaces extending at right angles relative to said intermediate surface, each intermediate surface abutting the other intermediate surface and having a groove cooperating with the groove of the other member to define an opening passing through said central structure, one of said end surfaces of each member abutting the other surface of the other member and having an outwardly directed flange, the other end surface of each member having a channel receiving said flange of the other member, said central structure having webs respectively extending outwardly from the corners thereof and carrying L-shaped arms at the free ends thereof to define channels having truncated triangular cross-sectional configurations interconnected to the exterior of said members by the spacing between adjacent L-shaped arms, said first partition parts being angularly disposed relative to and abutting said second partition part with the tops of all of said partition parts being coplanar and with said channels of said first partition parts facing upwardly, and a retainer having a cap portion superimposed on said top of said second partition part and being secured thereto by first fastening means received in said opening of said second partition part, said retainer having segments extending downwardly from said cap portion, said retainer having outwardly directed offset arms interconnected to said segments and being disposed parallel with said cap portion, said arms being received in said channels of said first partition parts and being secured thereto by second fastening means whereby said second partition part is held between said downwardly extending segments of said retainer.

References Cited by the Examiner

UNITED STATES PATENTS

| | | | |
|---|---|---|---|
| 747,441 | 12/1903 | Lanz | 52—732 |
| 782,495 | 2/1905 | Eichfeld | 52—732 |
| 2,576,840 | 11/1951 | Kessler | 189—36 |
| 2,915,149 | 12/1959 | Dreyfus | 52—241 |
| 2,925,154 | 2/1960 | Munro | 52—238 |
| 2,963,131 | 12/1960 | Brockway | 52—122 |
| 2,990,037 | 6/1961 | Fowles | 52—238 |
| 3,040,847 | 6/1962 | Webster | 52—400 |
| 3,061,055 | 10/1962 | Nijhuis | 189—36 |
| 3,170,201 | 2/1965 | Nofziger | 52—731 |

FOREIGN PATENTS

| | | |
|---|---|---|
| 492,727 | 7/1919 | France. |
| 1,231,738 | 10/1960 | France. |

FRANK L. ABBOTT, *Primary Examiner.*

RICHARD W. COOKE, Jr., *Examiner.*

R. S. VERMUT, *Assistant Examiner.*